United States Patent [19]
Mori

[11] Patent Number: 5,115,448
[45] Date of Patent: May 19, 1992

[54] SPREAD SPECTRUM RECEIVER

[75] Inventor: Masaharu Mori, Tokyo, Japan

[73] Assignee: Clarion Co., Ltd., Tokyo, Japan

[21] Appl. No.: 585,402

[22] Filed: Sep. 20, 1990

[30] Foreign Application Priority Data

Sep. 22, 1989 [JP] Japan .................................. 1-244930

[51] Int. Cl.⁵ .............................................. H04K 1/00
[52] U.S. Cl. ......................................... 375/1; 380/34; 380/48; 455/59; 375/96
[58] Field of Search ................... 370/105.2; 375/96, 1; 455/59; 380/34, 48

[56] References Cited

U.S. PATENT DOCUMENTS 4,847,862  7/1989  Braisted et al. ........................ 375/1
4,924,188  5/1990  Akazawa et al. .................... 375/1 X
4,932,036  6/1990  Goradia et al. ......................... 375/1
4,968,981  11/1990 Sekine et al. ........................ 375/1 X
4,972,441  11/1990 Roberts et al. ................... 375/96 X Primary Examiner—Tod Swann
Attorney, Agent, or Firm—Wallenstein, Wagner & Hattis, Ltd.

[57] ABSTRACT

A spread spectrum receiver using a correlator is disclosed, in which first and second comparing means comparing a correlation spike coming from the correlator with a first and a second reference voltage are used, the reference voltages being regulated, depending on the output of the first comparing means so that variations of the correlation spikes are followed precisely to obtain a two-valued correlation pulse.

18 Claims, 5 Drawing Sheets

SPREAD SPECTRUM RECEIVER

FIELD OF THE INVENTION

The present invention relates to a spread spectrum receiver and in particular to an improvement of a method, by which a two-valued correlation pulse is obtained from a correlation spike.

BACKGROUND OF THE INVENTION

In the spread spectrum communication using a convolver, there is known e.g. a circuit indicated in FIG. 6, by which a correlation pulse is obtained from a correlation spike outputted by the convolver. In the figure, reference numerals 21 to 23 are a first, a second and a third threshold detector, respectively; 24 and 25 are monostable multi-vibrators; 26 is an up-down counter of N bits; 27 is a D/A converter; and 28 is a voltage divider.

In the circuit described above, voltages $V_A$, $V_B$ and $V_C$ at outputs A, B and C of the voltage divider 28 are given to the detectors 21, 22 and 23, respectively, as threshold voltages, and the circuit works as indicated in the following table.

| STATE | OUTPUT a | OUTPUT b | STATE OF UP-DOWN COUNTER 26 | $V_A$, $V_B$, $V_C$ |
|---|---|---|---|---|
| 1 | PRESENT | PRESENT | COUNT UP | INCREASE |
| 2 | ABSENT | PRESENT | COUNT STOP | MAINTAINED |
| 3 | ABSENT | ABSENT | COUNT DOWN | DECREASE |

As the result of the operation described above, a relationship between a correlation spike $S_1$ and the threshold voltages $V_A$, $V_B$ and $V_C$, as indicated in FIG. 7(a), is valid and thus a threshold voltage $V_C$ suitable for restoring data so as to obtain a correlation pulse, as indicated in FIG. 7(b), is obtained.

However the prior art circuit construction has problems as described below.

1. Three threshold detectors are necessary.

2. $\Delta V = V_A - V_B$ should be sufficiently great so that the output of the D/A converter 27 is not varied by noise, for the case where the S/N ratio of the received signal is low and noise is superposed on the correlation spike, which worsens the reliability.

3. In the case where FSK or CSK (Code Shift Keying) modulation is effected on the transmitter side and the receiver side is operated so as to follow the frequency (for FSK) or the PN code (for CSK), a control delay $\tau$ is produced, as indicated in FIG. 8, and a time zone where the frequency or the PN code is instantaneously in disaccordance that, is produced. In this time zone, since the output of the convolver disappears, the threshold levels $V_A$ to $V_C$ are decreased and therefore, when the output of the convolver appears again, the threshold level can be suitable no more.

In FIG. 8, $\overline{PN}$ represents a time-inverted code of the PN code.

OBJECT OF THE INVENTION

Consequently the object of the present invention is to provide a spread spectrum receiver having correlation pulse generating mean having a good response, capable of obtaining a suitable threshold level, by which the threshold detection is simple.

SUMMARY OF THE INVENTION

In order to achieve the above object, a spread spectrum receiver according to the present invention is characterized in that it comprises a D/A converter, a correlator; first comparing means for comparing a first voltage corresponding to the output of the D/A converter with a correlation spike coming from the correlator; second comparing means for comparing a second voltage corresponding to the output of the D/A converter with the correlation spike coming from the correlator; switching means for outputting an inputted clock while switching over a first output and a second output therefor, depending on the output of the first comparing means; and counting means, whose count value varies, depending on the first and the second output described above, and which outputs the count value to the D/A converter described above.

BRIEF DESCRIPTION OF THE DRAWINGS

FIGS. 2A and 2B to 5 are schemes for explaining the operation thereof;

DETAILED DESCRIPTION

Figure 1:
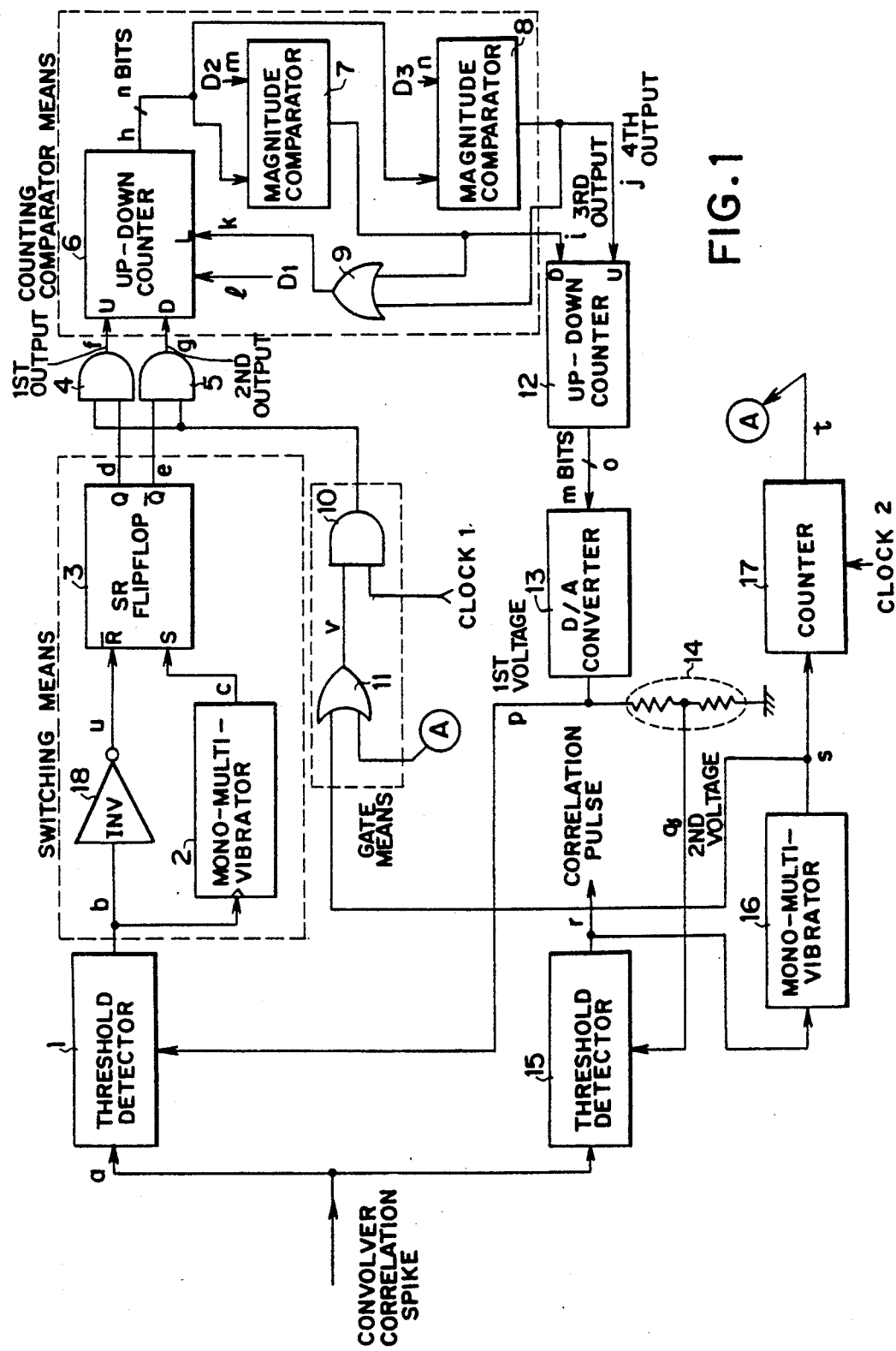
FIG. 1 is a block diagram of an embodiment of the present invention.

Hereinbelow an embodiment of the present invention will be explained, referring to the drawings.

FIG. 1 shows an embodiment of the correlation pulse generating circuit in a spread spectrum receiver according to the present invention, in which reference numerals 1 and 15 are first and second comparing means, each of which is composed of a threshold detector; 2 and 16 are monostable multi-vibrators; 3 is an SR flipflop; 4, 5 and 10 are AND gates; 6 and 12 are up-down counters; 7 and 8 are magnitude comparators; 9 and 11 are OR gates; 13 is a D/A converter; 14 is a voltage divider; 17 is a counter effecting counting operation, when the input is at the low level; and 18 is an inverter. The up-down counter 7, the magnitude comparators 7 and 8, and the OR gate 9 constitute a well-known random walk filter as count comparing means. Further the AND gate 4, the SR flipflop 3, the monostable multi-vibrator 2 and the inverter 18 constitute switching means. Still further the AND gate 10 and the OR gate 11 constitute a gate means.

Figure 2A:
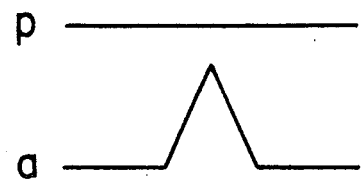

At first, the operation will be explained for the case of state, where a correlation spike a coming from the convolver is low with respect to the output p of the D/A converter 13, as indicated in FIG. 2A.

In this case, b is continuously at the "L level" and u is continuously at the "H level". Consequently the mono-multi-vibrator 2 is not triggered so that the output c thereof is at the "L level". Therefore the Q output d of the SR flipflop 3 is at the "H level" and the $\overline{Q}$ output e is kept at the "L level". If the output of the OR gate 11 is at the "H level", CLOCK 1 passes through the AND gates 10 and 4 and is given to the up-count input U of the up-down counter 6, which effects up-count. When the value of the count output h increases and reaches the value of the upper limit data D2, the output of the magnitude comparator 7 is changed to the "H level" and at the same time a load instruction signal k is given to the up-down counter 6 so that the count value is equal to the central value data D1. The up-down counter 12 counts down pulses i form the magnitude comparator 7. Therefore the value of the count output o decreases and the output voltage p of the D/A converter 13 is lowered so as to approach finally the peak value of the correlation spike a. As far as the state indicated in FIG. 2A, i.e. the state, where the peak value of the correlation spike a is lower than the voltage p described above, continues, this operation is repeated so that the voltage p described above continues to approach the peak value o the correlation spike a.

Figure 2B:
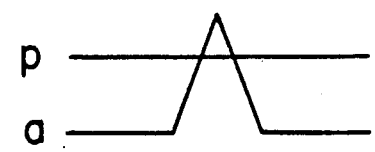

Next the operation in the state indicated in FIG. 2B will be explained. In this case, pulses appear periodically at the output b of the threshold detector 1, which repeats to trigger the mono-multi-vibrator 2. Consequently since the output c of the monostable multi-vibrator 2 is at the "H level" and the output u of the inverter 18 is periodically at the "L level", the Q output d of the SR flipflop 3 is at the "L level" and the $\overline{Q}$ output e is at the "H level". CLOCK 1 passes the AND gates 10 and 5 and the up-down counter 6 effects down-count. When the value of the count output h reaches the lower limit value date D3 of n, the outputs of the magnitude comparator 8 is at the "H level" and the count value of the up-down counter 6 is equal to the central value data D1. Consequently the up-down counter 12 effects up-count so that the value of the count output o increases and the voltage p described above is raised. That is, the voltage p increases so as to approach the peak value of the correlation spike a.

As explained above, the voltage p described above is controlled so as to approach the peak value of the correlation spike a. In the case where the voltage p is almost in accordance with the correlation spike a, the voltage p repeats to be finely raised and lowered so as to follow the neighborhood of the peak value. Since the voltage p follows the peak value of the correlation spike a, it is possible to obtain a correlation pulse r by using an always suitable threshold voltage, even if the peak value of the correlation spike varies, by forming the threshold value by using a voltage of obtained by suitably dividing the voltage p.

Now the operation of the random walk filter described previously will be explained. The data set D1, D2 and D3 given to the random walk filter is chosen, in general, so as to satisfy $$D2 > D1 \approx \frac{D2 - D3}{2} + D3 > D3 \quad (1)$$

Figure 3:
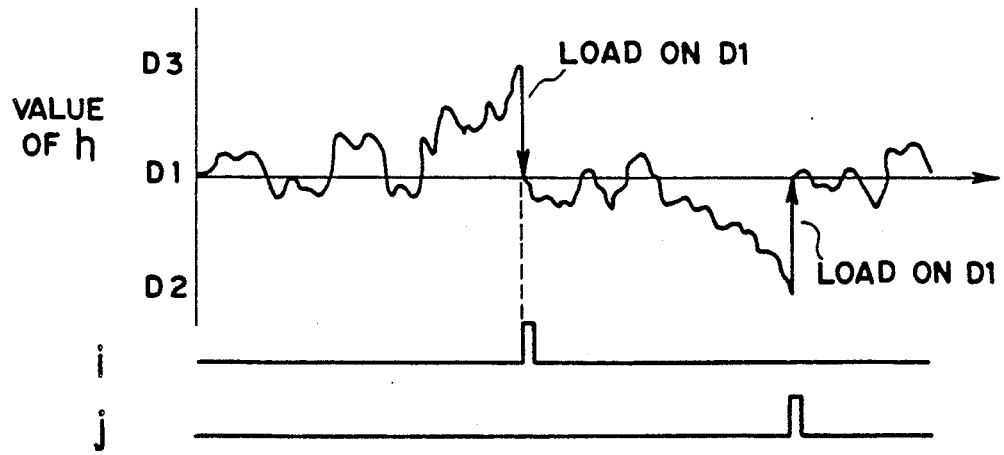
Figure 4:
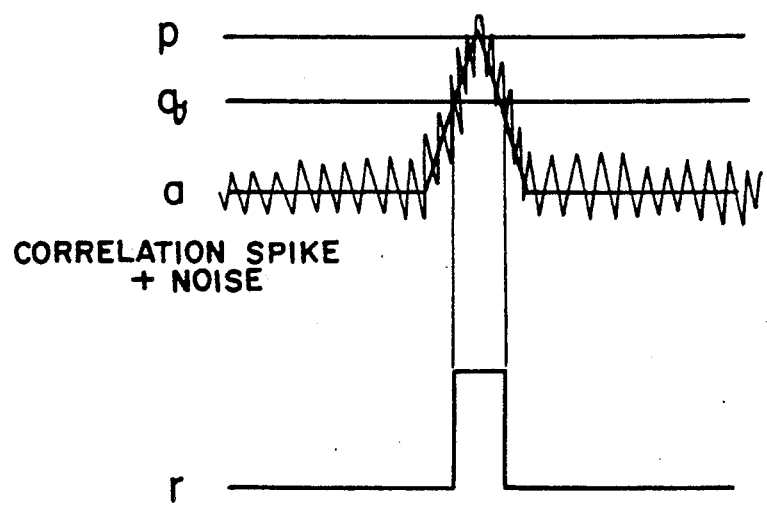

As an example, they are so chosen that D1=8, D2=15 and D3=0. By inserting such a random filter, in the case where the S/N ratio of the received signal is low and remarkable noise is mixed in the correlation spike, it can be alleviated that the voltage p described above is varied by noise. In the case where the voltage p is in accordance with the peak value of the correlation spike, the up-down counter 6 repeats up and down by noise. It is only occasionally that the count value reaches the upper limit data D2 or the lower limit data D3. This aspect is indicated in FIG. 3. In this way variations in the voltage p are reduced.

Next the the operation of the embodiment described above against an instantaneous disappearance of the correlation spike will be explained. When the correlation spike disappears, the correlation pulse r disappears and thus it does not trigger the multivibrator 16. Then, the output s thereof is changed from the "H level" to the "L level". At this time, since the output t of the counter 17 is also at the "L level", the output v of the OR gate 11 is at "L level" and CLOCK 1 cannot pass through the AND gate 10 and the counting operation of the up-down counter 6 is stopped. That is, the output voltage p of the D/A converter varies no more and keeps the directly preceding state. When the correlation spike a of the convolver appears again, the correlation pulse r appears, and the output s of the monostable multi-vibrator 16 is turned to the "H level", the up-down counter 6 begins again the counting operation to start the peak value following operation.

Figure 5:
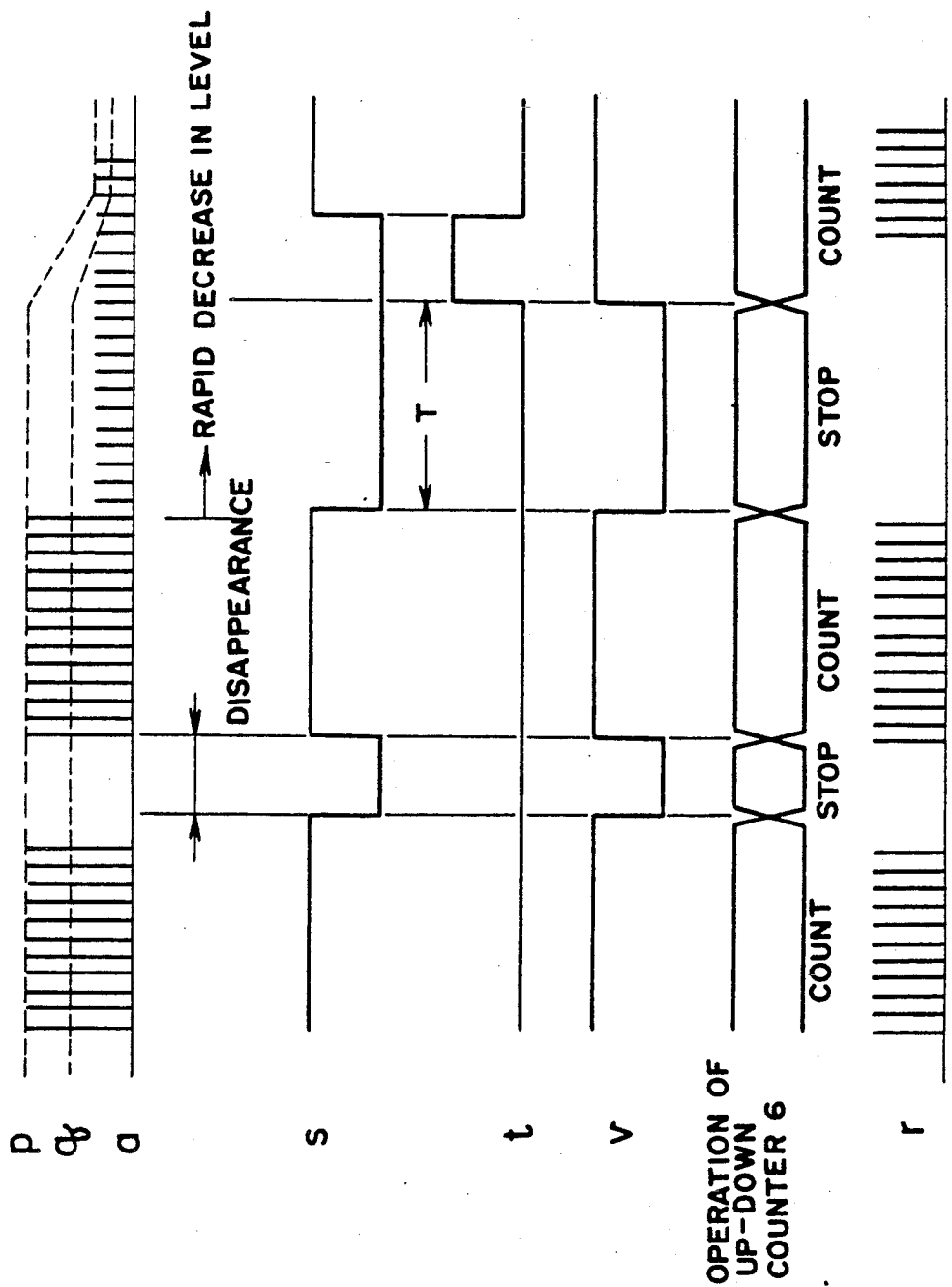
Figure 6:
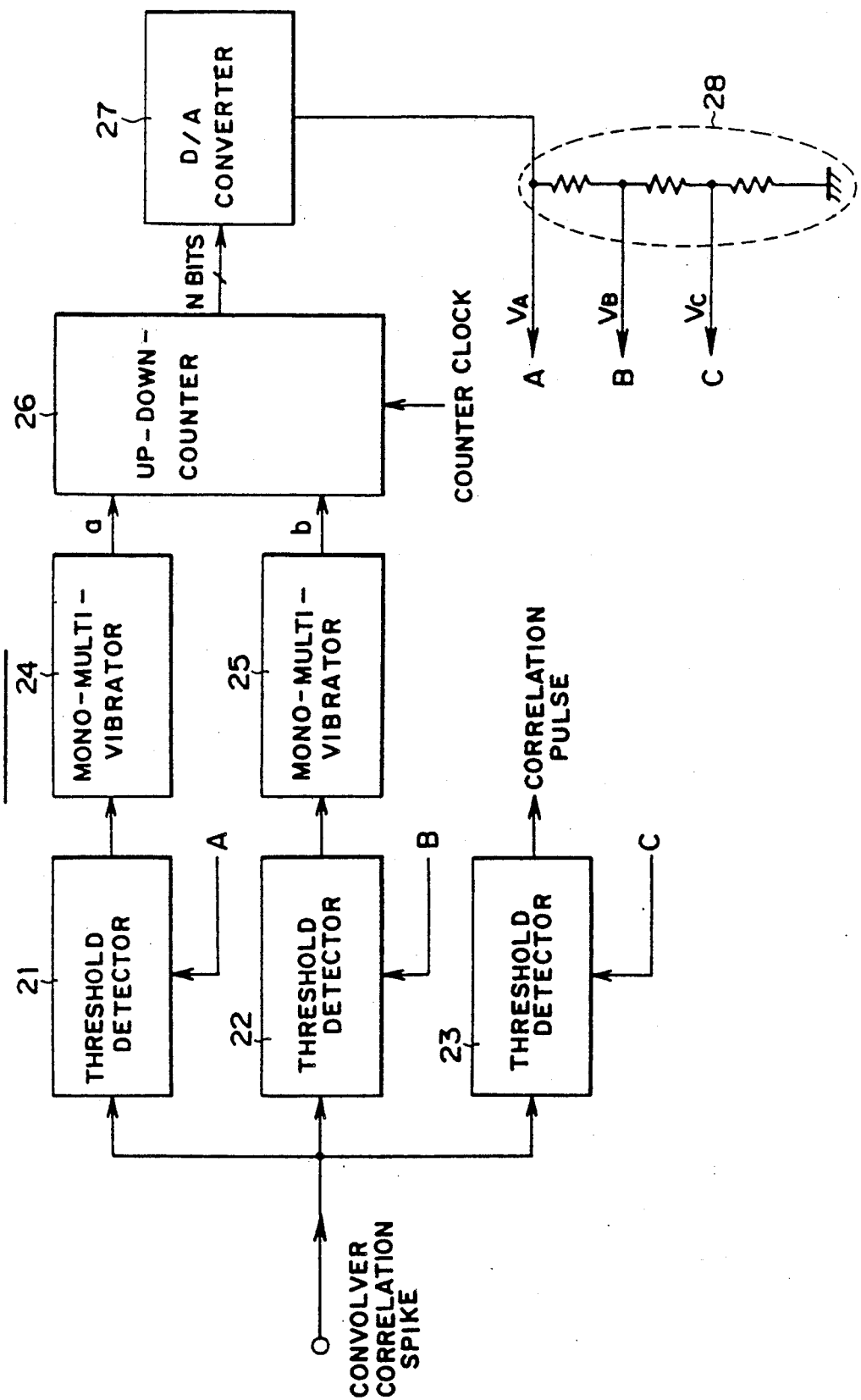
FIG. 6 is a block diagram of a prior art correlation pulse generating circuit.
Figure 7:
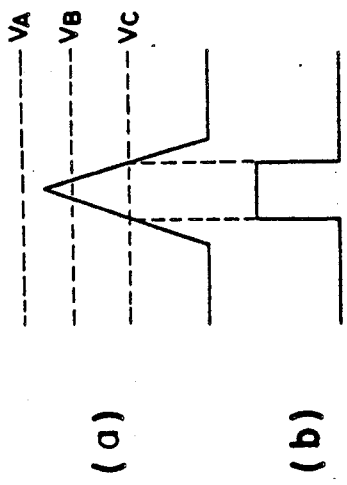
FIGS. 7 and 8 are schemes for explaining the operation thereof.
Figure 8:
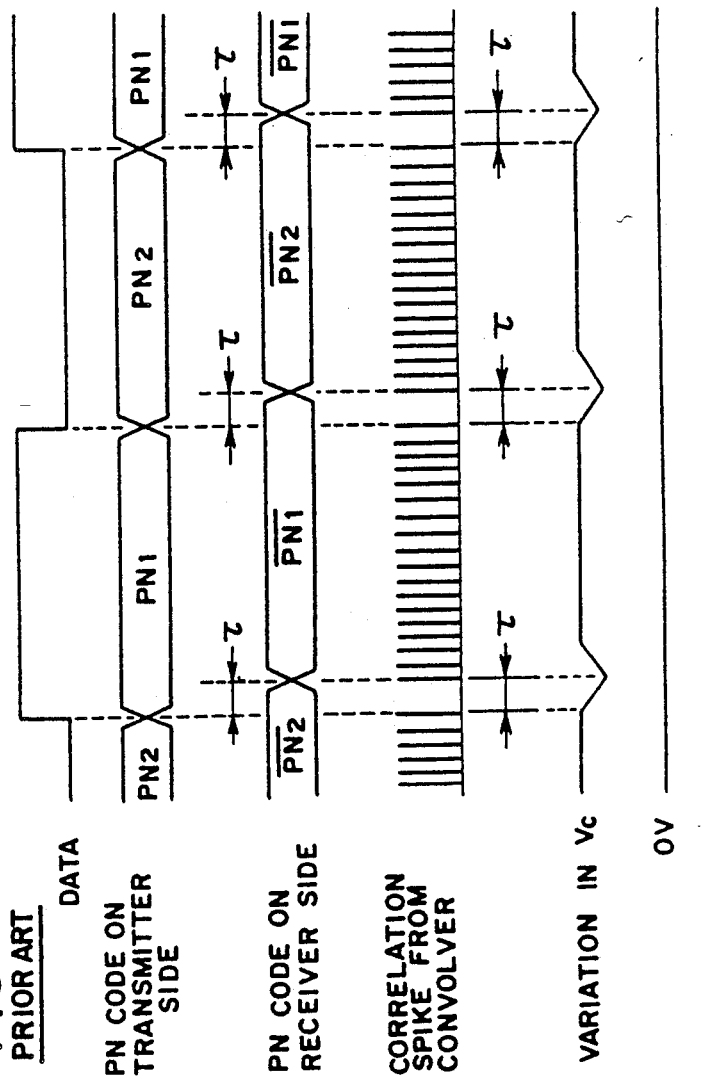

As described above, since the directly preceding threshold voltage is kept during the instantaneous disappearance indicated in FIG. 5, a suitable threshold level can be obtained, also when the correlation spike appears again.

However, in the case where this disappearance is not due to the normal operation, but for example the reception level is lowered rapidly, the counting operation of the up-down counter 6 remains stopped, until the reception level is restored again. Therefore the peak value cannot be followed and as a result long burst errors would be produced. For this reason, in the embodiment described above, when the correlation pulse r disappears, the output s of the multivibrator 16 is turned from the "H level" to the "L level". The counter 17 carries out the counting operation, when the output s stated above is at the "L level", and the count value is "0", when the output s is at the "L level". It is a counter which is so constructed that it carries out the counting operation, when the output s is at the "L level", and the count t thereof is turned from the "L level" to the "H level", when the count value reaches a predetermined value C. When the output s of the multi-vibrator 16 is turned to the "L level", the counter 17 begins to count CLOCK 2 and after a predetermined period of time T, the count output t is turned to the "H level". At this time, the disappearance continues yet and even if the output s stated above is at the "L level", the output v of the OR gate 11 is at the "H level". Thus the up-down counter 6 begins again the counting operation. FIG. 5 indicates the operation described above.

As explained above, according to the present invention, it is possible to simplify the construction of the threshold detectors, to improve response characteristics and to obtain a threshold level suitable for transforming a correlation spike into a correlation pulse.

What is claimed is:

1. A signal processing circuit processing pulses received from a convolver in a spread spectrum receiver and sending processed pulses to an output terminal comprising:

first comparison means for providing an output pulse responsively to receipt of each convolver pulse of amplitude greater than that of a first reference signal level supplied to said first comparison means;

second comparison means for providing to said output terminal a processing circuit output pulse responsively to receipt of each convolver pulse of amplitude greater than that of a second reference signal level supplied to said second comparison means;

means for supplying said second reference signal level as a given fraction of said first reference signal level;

reversible system counting means including first and second counter input terminal means for providing an output signal condition indicative of a number stored therein, and including means for incrementing said number responsively to pulses supplied to one of said counter input terminal means and means for decrementing said number responsively to pulses supplied to the other of said counter input terminal means;

pulsing means for supplying a train of pulses to said first counter input terminal means responsively to the presence of output pulses at said first comparison means and including means for supplying a train of pulses to said second counter input terminal means responsively to the absence of output pulses from said first comparison means; and digital-to-analogue converter means responsive to said output signal condition of said system counting means for providing said first reference signal level so that said reference signal level rises responsively to the presence of said output pulses of said first comparison means and decreases responsively to the disappearance of said output pulses of said first comparison means.

2. The signal processing circuit of claim 1 including delay means responsive to the absence of said system output pulses for a given period of time for delaying generation of said second train of pulses until said given period of time has elapsed.

3. The signal processing circuit of claims 1 or 2 including means for preventing a variation of said number stored in said system counting means from changing during receipt of said first train of pulses until a sequential plurality of pulses of said first train of pulses have been received by said system counting means and means for preventing a variation of said number stored in said system counting means from changing during receipt of said second train of pulses until a sequential plurality pulses of said second pulse train have been received by said system counting means.

4. The signal processing circuit of claim 3 wherein said system counting means includes:

a first reversible counter having its inputs connected to said first and second counter input terminal means;

a second reversible counter for providing said output signal condition to said digital-to-analogue converter means;

first magnitude comparator means having a given first numerical value stored therein and responsive to the number stored in said first reversible counter for outputting a first comparator signal condition indicative of a match therebetween, said first magnitude comparator means including means for resetting the number stored in said first reversible counter to a given second numerical value below said given first numerical value responsively to said first comparator signal condition, and including means for driving said second reversible counter in a given direction responsively to each appearance of said first comparator signal condition; and second magnitude comparator means having a given third numerical value stored therein less than said second numerical value and responsive to the number stored in said first reversible counter for outputting a second comparator signal condition indicative of a match therebetween, said second magnitude comparator means including means for resetting the number stored in said first reversible counter to said second numerical value responsively to said second comparator signal condition, and including means for driving said second reversible counter in the opposite direction responsively to each appearance of said second comparator signal condition.

5. The signal processing circuit of claim 3 including means for providing said first train of pulses in synchronism with said output pulses of said first comparison means.

6. The signal processing circuit of claim 3 including means for providing said second train of pulses in synchronism with said system output pulses when they are present.

7. A level control circuit for stabilizing the height of pulses produced responsively to receipt of correlation spikes received from a convolver in a spread-spectrum receiver and having varying pulse height comprising:

D/A converter means for producing analogue output signals varying responsively to the numerical value of digital signals supplied thereto;

clock means for locally supplying a periodic train of pulse signals;

first comparison means for comparing a first reference voltage derived from the output of said D/A converter means with the level of a received correlation spike and including means for supplying an output pulse whenever the level of said correlation spike bears a given relationship to said first reference voltage;

second comparison means for comparing a second reference voltage derived from the output of said D/A converter means and different from said first reference voltage with the level of a received correlation spike and including means for supplying an output pulse whenever the level of said correlation spike exceeds said second reference voltage;

switching means having first and second output ports for supplying pulses from said periodic train of pulse signals responsively to the presence or absence of said first comparison means output pulses respectively to said first and second output ports;

up-down counter means for performing up-counting and down-counting responsively to pulse signals received from said first and second output ports respectively, and including means for supplying its resultant count value to said D/A converter means to govern said first and second reference voltages.

8. The level control circuit of claim 7 wherein said first comparison means supplies an output pulse whenever the level of said correlation spike exceeds said first given reference voltage, said second comparison means supplies an output pulse whenever the level of said correlation spike exceeds said second reference voltage, said second reference voltage is less than said first reference voltage, and said up-down counter means is configured to perform counting in a direction to cause said D/A converter means to increase said reference voltages responsively to receipt of pulses from said first output port of said switching means.

9. The level control circuit of claim 8 including means for providing said second reference voltage as a given fraction of said first reference voltage.

10. The level control circuit of claim 7 wherein said up-down counting means includes random walk filter means.

11. The level control circuit of claim 7 including gating means for disabling passage of said train of pulse signals to said up-down counter means responsively to the absence of pulses from said second comparison means and override means for passing said train of pulse signals to said second output port of said switching means beginning a given time after the disappearance of pulses from said second comparison means.

12. The level control circuit of claim 11 wherein said gating means and said override means include free-running counter means producing a terminal count output signal condition after a given count has been attained, said free-running counter means including means for resetting said count to zero responsively to generation of each output pulse by said second comparison means, and a gating circuit enabling passage of said train of pulses to said switching means responsively either to generation of an output pulse by said second comparison means or to generation of said terminal count output signal condition.

13. A level control circuit for stabilizing the height of pulses produced responsively to receipt of correlation spikes received from a convolver in a spread-spectrum receiver and having varying height comprising:

D/A converter means for producing analogue output signals varying responsively to the numerical value of digital signals supplied thereto;

clock means for locally supplying a periodic train of pulse signals;

first comparison means for comparing a first reference voltage derived from the output of said D/A converter means with the level of a received correlation spike and including means for supplying an output pulse whenever the level of said correlation spike exceeds said first reference voltage;

second comparison means for comparing a second reference voltage derived from the output of said D/A converter means and different from said first reference voltage with the level of a received correlation spike and including means for supplying an output pulse whenever the level of said correlation spike exceeds said second reference voltage;

switching means having first and second output ports for supplying said pulse signals responsively to the presence or absence of said first comparison means output pulses to said first and second output ports respectively;

first up-down counter means having an up count terminal and a down count terminal one of which is fed with pulse signals from said first port and the other of which is fed with pulse signals from said second port to activate up counting and down counting of said first counter means, said first counter means including means for outputting a first output signal when its count value exceeds a first given value, means for outputting a second output signal when said count value is below a second given value, and means for resetting said count to a given initial value when either of said output signals is sent out; and second up-down counter means for executing respectively up counting and down counting responsively to said first and second output signals, and including means for supplying its resultant count value to said D/A converter means to govern said first and second reference voltages.

14. The level control circuit of claim 7 or 13 wherein said switching means includes flipflop means operable between set and reset conditions according to the output state of said first comparison means, and gate means for selectively supplying said pulse signals alternatively to said switching means first and second output ports responsively to the output state of said flipflop means.

15. The level control circuit of claim 13 wherein said given initial value lies between said first and second given values.

16. The level control circuit of claim 15 including means for providing said second reference voltage as a given fraction of said first reference voltage, and said first and second up-down counter means are configured to perform counting in directions to cause said D/A converter means to increase said reference voltages responsively to receipt of pulses from said first comparison means.

17. The level control circuit of claim 16 including gating means for disabling passage of said train of pulse signals to said first up-down counter means responsively to the absence of pulses from said second comparison means and override means for passing said train of pulse signals beginning a given time after the disappearance of pulses from said second comparison means to the output port of said switching means which when pulsed causes said D/A converter means to decrease said reference voltages.

18. The level control circuit of claim 17 wherein said gating means and said override means includes free-running counter means producing a terminal count output signal condition after a given count has been attained, said free-running counter means including means for resetting said count to zero responsively to generation of each output pulse by said second comparison means, and a gating circuit enabling passage of said train of pulses to said switching means responsively either to generation of an output pulse by said second comparison means or to generation of said terminal count output signal condition.

* * * * *